United States Patent [19]
Testerman

[11] Patent Number: 5,212,998
[45] Date of Patent: May 25, 1993

[54] TRANSMISSION CONTROL SYSTEM WITH LOAD COMPENSATED SHIFT MODULATION

[75] Inventor: Michael D. Testerman, Dearing, Kans.

[73] Assignee: Deere & Company, Moline, Ill.

[21] Appl. No.: 801,194

[22] Filed: Dec. 2, 1991

[51] Int. Cl.$^5$ .............................................. B60K 41/06
[52] U.S. Cl. .................................... 74/335; 364/424.1
[58] Field of Search ........... 364/424.1; 74/335, 336 R, 74/337, 730.1, 731.1, 732.1

[56] References Cited

U.S. PATENT DOCUMENTS

| | | | |
|---|---|---|---|
| 4,367,528 | 1/1983 | Kawamoto et al. | 364/424.1 X |
| 4,485,443 | 11/1984 | Knödler et al. | 364/424.1 |
| 4,676,348 | 6/1987 | Coutant | 74/335 X |
| 4,835,694 | 5/1989 | Yamamoto et al. | 364/424.1 |
| 4,836,057 | 6/1989 | Asayama et al. | 74/866 |
| 4,843,902 | 7/1989 | Patton et al. | 74/335 |
| 4,855,913 | 8/1989 | Brekkestran et al. | 74/866 |
| 4,967,385 | 10/1990 | Brekkestran et al. | 364/424.1 |
| 4,977,797 | 12/1990 | Aoki et al. | 74/731.1 X |

OTHER PUBLICATIONS

SAE Technical Paper Series 861212 "The Design and Development of a Four Speed Powershift Transmission with Electronic Clutch Pressure Modulation", Sep. 8, 1986.

Primary Examiner—Leslie A. Braun
Assistant Examiner—Nicholas Whitelaw

[57] ABSTRACT

A vehicle has a powershift transmission driven by an engine via a torque converter. The transmission is shifted by pressure operated clutches which are controlled by electrohydraulic pressure control valves. A speed ratio value representing a ratio of the torque converter output shaft speed to the torque converter input shaft speed is determined. A minimum clutch pressure value and a slope value are determined as a function of the speed ratio value. During a shifting of the transmission, a pulse-width-modulated signal applied to the valve is controlled so that the pressure applied to the clutch will vary from the minimum clutch pressure to a maximum clutch pressure at a rate proportional to the slope value.

11 Claims, 3 Drawing Sheets

TRANSMISSION CONTROL SYSTEM WITH LOAD COMPENSATED SHIFT MODULATION

BACKGROUND OF THE INVENTION

The present invention relates generally to a vehicle transmission control system, and more particularly to a transmission control system for a transmission which is shifted by pressure operated clutches.

It is known to provide an automatic control system for a vehicle powershift transmission having pressure operated clutches controlled by electrohydraulic valves. Some aspects of this technology are described by Goodbar and Testerman in "The Design and Development of a Four Speed Powershift Transmission with Electronic Clutch Pressure Modulation" published in 1986 as SAE Technical Paper No. 861212. One such microprocessor-based control system is further described in U.S. Pat. No. 4,855,913, issued 8 Aug. 1989 to Brekkestran et al. Both of these references disclose that it is known to modulate or gradually increase transmission clutch pressure to achieve a smooth gear shift. With these systems transmission clutch pressure modulation was typically designed to be acceptable under conditions of heavy loading. This results in an abrupt or jerky gear shift under light load conditions. U.S. Pat. No. 4,836,057, issued 6 Jun. 1989 to Asayama et al., also shows a system for controlling transmission speed change clutches. In this system the "pattern" or rate of change of clutch pressure is varied as a function of vehicle weight and a parameter referred to as "speed reduction ratio constant", all for the purpose of limiting "jerk" or speed change shock. However, none of these known systems allow the manner in which transmission clutch pressure is modulated to be varied to compensate for changes in the degree of loading of the drive train. Accordingly, it would be desirable to have a transmission control system which provides smooth shifting under varying conditions of loading.

SUMMARY OF THE INVENTION

An object of the present invention is to provide a transmission control system which provides smooth shifting under varying conditions of loading.

These and other objects are achieved by the present invention wherein a vehicle has a powershift transmission driven by an engine via a torque converter. The torque converter has an input shaft connected to the engine and an output shaft connected to the transmission. The transmission is shifted by pressure operated clutches which are controlled by solenoid operated electrohydraulic pressure control valves. A pair of shaft speed sensors sense the rotation speed of the torque converter input shaft and output shaft and a speed ratio value representing a ratio of the output shaft speed to the input shaft speed is determined. A minimum clutch pressure value and a slope value are determined as a function of the speed ratio value. During a shifting of the transmission, a pulse-width-modulated signal applied to the valve is controlled so that the pressure applied to the clutch will vary from the minimum clutch pressure to a maximum clutch pressure at a rate proportional to the slope value.

DETAILED DESCRIPTION

Figure 1:
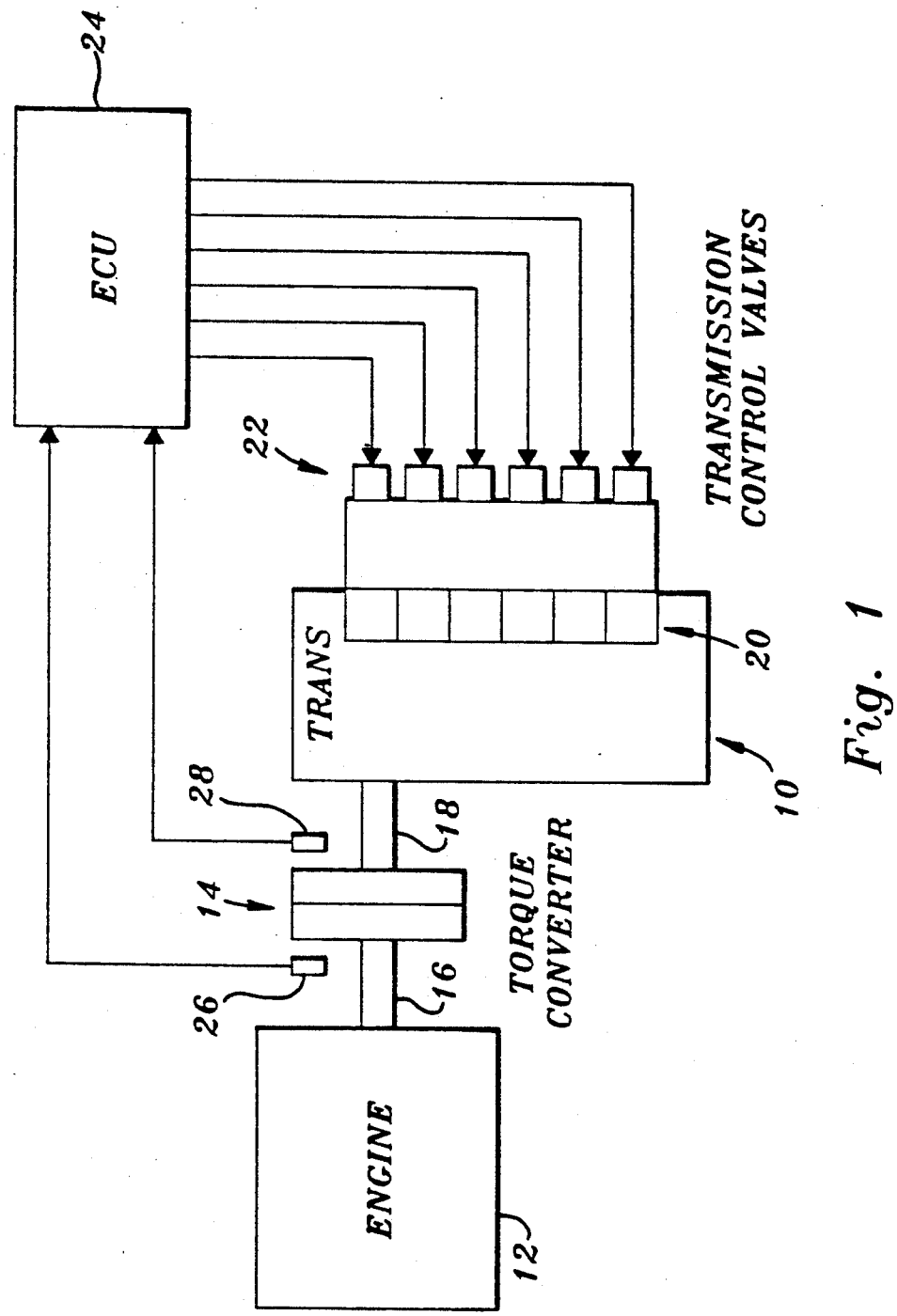
FIG. 1 is a simplified schematic diagram of a vehicle transmission control system according to the present invention.

Referring to FIG. 1, a vehicle includes a powershift transmission 10 driven by an engine 12. The engine is coupled to the transmission 10 by a torque converter 14 which has an input shaft 16 connected to the engine 12 and an output shaft 18 connected to the transmission 10. The transmission 10 includes a plurality of pressure operated clutches 20 for controlling shifting of the transmission 10. The clutches are controlled by electrohydraulic transmission on-off control valves 22. Pressure is supplied to the on-off valves 22 by a proportional valve (not shown). The valves 22 are in turn controlled by an electronic control unit (ECU) 24. The elements described so far are conventional, for further information reference is made to U.S. Pat. No. 4,855,913, issued 8 Aug. 1989 to Brekkestran et al., which is incorporated by reference herein.

According to the present invention, an input shaft speed sensor 26 is mounted to sense the rotation speed of the torque converter input shaft 16, and an output shaft speed sensor 28 is mounted to sense the rotation speed of the torque converter output shaft 18.

The ECU is connected to receive the speed signals from sensors 26 and 28 and provides output signals to the transmission control valves 22. The output signals are derived from the speed signals by the ECU which executes the algorithm which is illustrated by the flow chart of FIG. 2.

Figure 2:
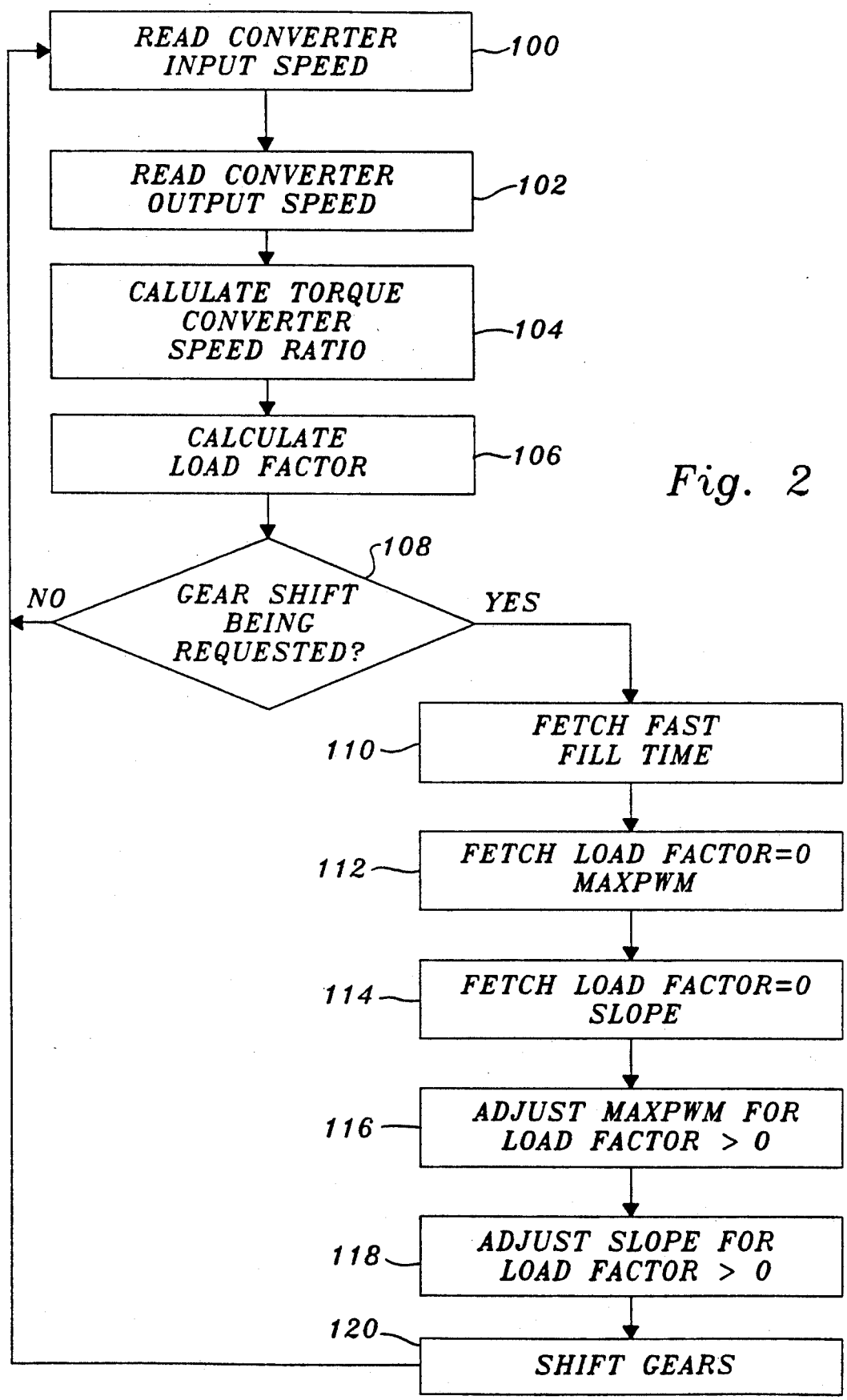
FIG. 2 is a simplified logic flow diagram of an algorithm executed by the electronic control unit of FIG. 1.
Figure 3:
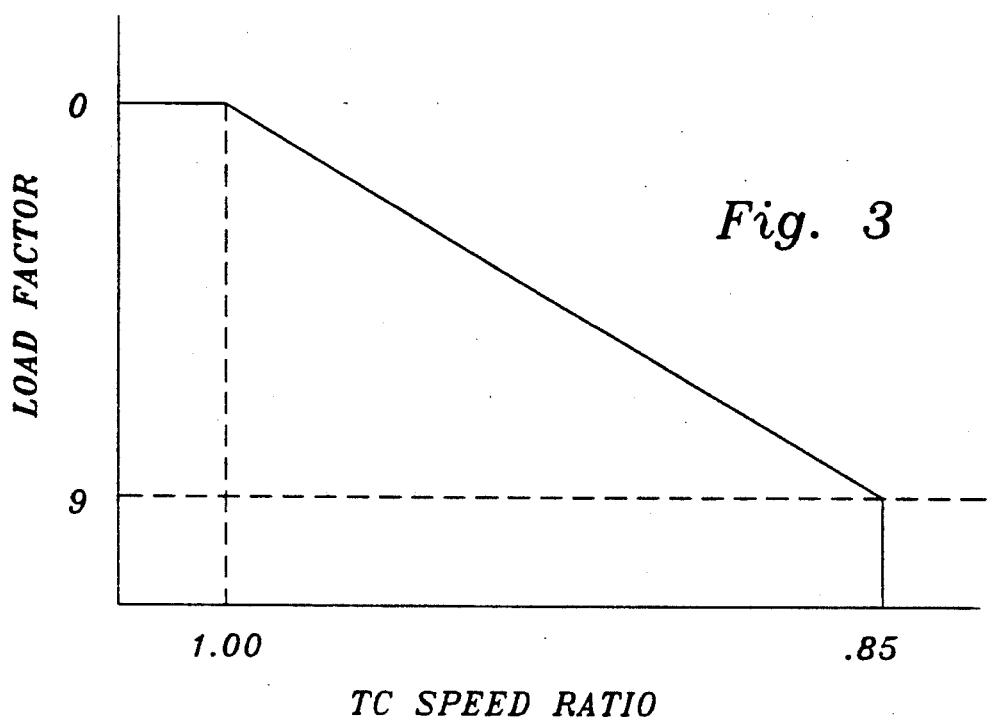
FIG. 3 is a graphical representation of the relationship of a load factor value to torque converter speed ratio.

Turning now to FIG. 2, the algorithm begins at steps 100 and 102 which read the signals from the speed sensors 26 and 28. Then in step 104, a speed ratio value is determined as the ratio of the speed of torque converter output shaft 18 divided by speed to the torque converter input shaft 16. Next, step 106 derives a load factor value as a linear function of the speed ratio value determined in step 104. This linear relationship is illustrated graphically by FIG. 3. For example, when the output shaft 18 is rotating at the same speed as the input shaft 16, the speed ratio is 1.0. This means there is no load on the torque converter 14 and the load factor is assigned a value of zero. The load factor will increase linearly with decreasing speed ratio to a load factor value of 9.0 corresponding to a speed ratio of 0.85, which represents a heavier load on the torque converter 14. For heavier loading represented by speed ratios less than 0.85, the load factor will remain constant at 9.0.

Step 108 determines whether a shift of the transmission 10 has been requested, such as in response to operator action or changing conditions. If a shift has been requested then step 108 directs the algorithm to steps 110-114, otherwise the algorithm is directed back to step 100.

Step 110 operates to select, from a table of values stored in memory, for a particular one of the pressure operated clutches 20, a fast fill time value. This fast fill time value will correspond to the time during which the pressure operated clutch 20 must be fully pressurized in order for its clutch elements (not shown) to be brought into engagement with each other.

Step 112 operates to select, from a table of values stored in memory, for a particular one of the pressure operated clutches 20, a maximum pulse width modulation duty cycle value corresponding to a zero load factor. This maximum pulse width modulation duty cycle value will correspond to the minimum pressure which would be applied to the pressure operated clutch 20 after expiration of the fast fill time, assuming zero load.

Next, step 114 operates to select, from a table of values stored in memory, for a particular one of the pressure operated clutches 20, a slope value corresponding to a zero load factor. This slope value will correspond to the rate of increase of the pressure which would be applied to the pressure operated clutch 20 after expiration of the fast fill time, again assuming zero load.

Next, in step 116, the maximum pulse width modulation value determined in step 112 is adjusted or reduced for increasing load factor values. Thus, the higher the loading, the greater will be the pressure applied (after fast filling) to the clutch 20, and conversely, the lower the loading, the smaller will be the pressure applied (after fast filling) to the clutch 20.

Next, in step 118, the slope value determined in step 112 is adjusted or increased for increasing load factor values. Thus, the higher the loading, the faster will be the rate of increase of the pressure applied to the clutch 20, and conversely, the lower the loading, the slower will be the rate of increase of the pressure applied to the clutch 20.

Figure 4:
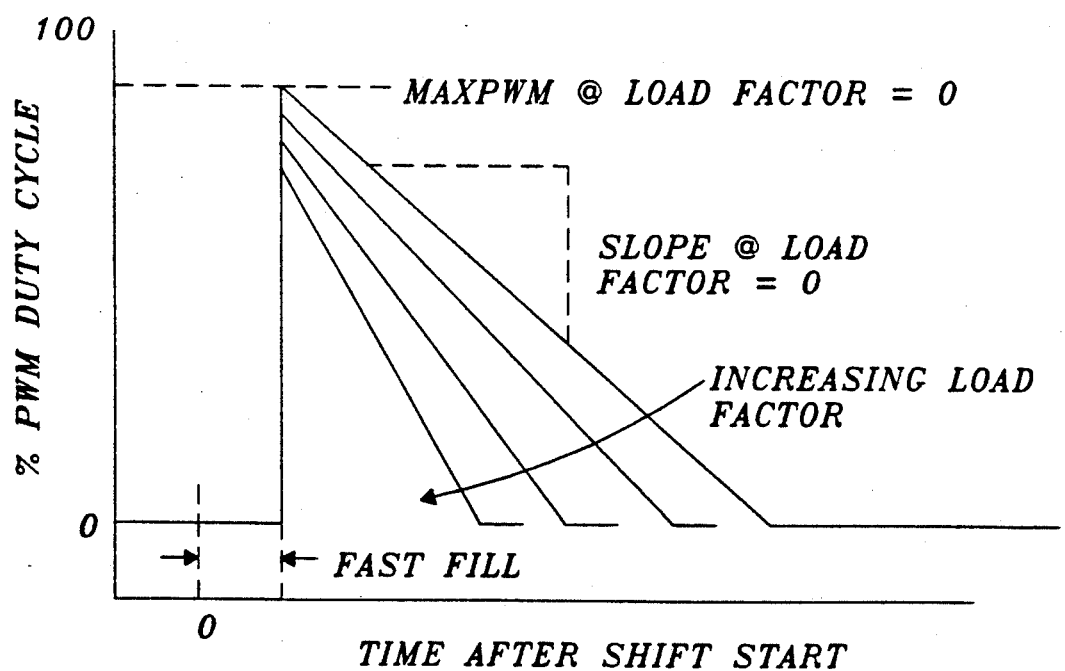
FIG. 4 is a graphical representation, which, for a range of load factor values, illustrates how the pulse-width-modulation duty cycle varies as a function of time during a transmission shift.

Following step 118, step 120 will cause the transmission 10 to be shifted with a clutch pressure versus time characteristic corresponding to a duty cycle versus time relationship such as illustrated graphically in FIG. 4. After a shift is completed, the algorithm returns to step 100. FIG. 4 illustrates how this duty cycle versus time relationship will vary as a function of changes in load factor. From FIG. 4 it is seen that shift modulation is in three phases:
1. Fast fill time during which full pressure is applied to the clutch in order to fill rapidly.
2. A load dependent minimum clutch pressure is applied to the clutch immediately following the fast fill time.
3. Then the clutch pressure is gradually increased from the minimum clutch pressure to a maximum pressure at a certain load dependent rate.

The result is a comfortable transmission shift under all loading conditions.

While preferred embodiments of the invention have been illustrated and described, it will be apparent to those skilled in the art that variations and modifications thereof can be made without departing from the underlying principles of the invention. For example, in another situation the relationship between torque converter speed ratio and load factor may not be linear. Also, clutch pressure may be modulated as a function of other parameters such as engine speed. Also, load may be measured using alternative means in vehicles which do not use a torque converter. Finally, this invention would be applicable in systems which have a separate proportional valve controlling each clutch. Accordingly, this invention is intended to embrace all such alternatives, modifications and variations which fall within the spirit and scope of the appended claims.

I claim:

1. In a vehicle having a drive train comprising a powershift transmission driven by an engine, at least one pressure operated clutch for controlling shifting of the transmission, and at least one valve for controlling hydraulic pressure supplied to the clutch, and a control unit cooperating with the valve to apply to the clutch, during a shift of the transmission, a pressure which gradually increases from a minimum pressure to a maximum pressure, characterized by:
   means for sensing a load parameter representing a load on the drive train;
   means for varying the minimum clutch pressure value as a function of the load parameter; and
   means for varying a rate at which the clutch pressure increases as a function of the load parameter.

2. The invention of claim 1, wherein:
   the minimum clutch pressure decreases as the load parameter decreases.

3. The invention of claim 1, wherein:
   the rate of change of clutch pressure decreases as the load parameter decreases.

4. The invention of claim 1, characterized by:
   a torque converter having an input shaft connected to the engine and an output shaft connected to the transmission;
   an input shaft speed sensor for sensing a rotation speed of the torque converter input shaft;
   an output shaft speed sensor for sensing a rotation speed of the torque converter output shaft; and
   means for determining the load parameter from a ratio of the output shaft speed to the input shaft speed.

5. In a vehicle having a powershift transmission driven by an engine via a torque converter having an input shaft connected to the engine and an output shaft connected to the transmission, at least one pressure operated clutch for controlling shifting of the transmission, and at least one valve for controlling hydraulic pressure supplied to the clutch, and a control unit cooperating with the valve to apply to the clutch during a shift of the transmission, a pressure which gradually increases from a minimum pressure to a maximum pressure, characterized by:
   means for sensing a load parameter representing a load on the torque converter; and
   means for varying the minimum clutch pressure value as a function of the load parameter.

6. The invention of claim 5, wherein:
   the minimum clutch pressure decreases as the load parameter decreases.

7. The invention of claim 5, further comprising:
   means for varying the rate of change of clutch pressure as a function of the load parameter.

8. The invention of claim 7, wherein:
   the rate of change of clutch pressure decreases as the load parameter decreases.

9. The invention of claim 5, characterized by:
   an input shaft speed sensor for sensing a rotation speed of the torque converter input shaft;
   an output shaft speed sensor for sensing a rotation speed of the torque converter output shaft; and means for determining the load parameter from a ratio of the output shaft speed to the input shaft speed.

10. In a vehicle having a powershift transmission driven by an engine via a torque converter having an input shaft connected to the engine and an output shaft connected to the transmission, at least one pressure operated clutch for controlling shifting of the transmission, and at least one valve for controlling hydraulic pressure supplied to the clutch, a control system comprising:

an input shaft speed sensor for sensing a rotation speed of the torque converter input shaft;

an output shaft speed sensor for sensing a rotation speed of the torque converter output shaft;

means for determining a speed ratio value representing a ratio of the output shaft speed to the input shaft speed;

means for determining a minimum clutch pressure value as a function of the speed ratio value;

means for determining a slope value as a function of the speed ratio value; and control means coupled to the valve to cause the valve to control the pressure communicated to the clutch as a function of the minimum clutch pressure value and the speed ratio value during a shifting of the transmission, the control means causing the valve to vary said pressure from said minimum clutch pressure to a maximum clutch pressure at a rate proportional to the slope value.

11. The invention of claim 10, further comprising:

means for determining a load factor value as a linear function of the speed ratio value;

means for determining a minimum clutch pressure value as a function of the load factor value; and means for determining a slope value as a function of the load factor value.

* * * * *